United States Patent
Mercado et al.

(10) Patent No.: US 9,698,590 B1
(45) Date of Patent: *Jul. 4, 2017

(54) PERSONAL ELECTRONIC INJURY PROTECTION DEVICE

(71) Applicants: Eusebio Mercado, Killeen, TX (US); Rafael Castillo, Killeen, TX (US)

(72) Inventors: Eusebio Mercado, Killeen, TX (US); Rafael Castillo, Killeen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,247

(22) Filed: Oct. 13, 2015

Related U.S. Application Data

(63) Continuation-in-part of application No. 14/501,309, filed on Sep. 30, 2014.

(51) Int. Cl.
*H02H 3/20* (2006.01)
*H01H 71/12* (2006.01)
*G05B 9/02* (2006.01)

(52) U.S. Cl.
CPC .............. *H02H 3/20* (2013.01); *G05B 9/02* (2013.01); *H01H 71/128* (2013.01)

(58) Field of Classification Search
CPC ... H02H 3/20; H02H 5/12; G05B 9/02; G08B 7/06; G08B 13/1966; G08B 13/19619–13/19682; G08B 15/02; H01H 71/128
See application file for complete search history.

(56) References Cited

U.S. PATENT DOCUMENTS

| | | | |
|---|---|---|---|
| 3,784,842 A | 1/1974 | Kremer | |
| 4,983,954 A | 1/1991 | Huston | |
| D406,067 S | 2/1999 | Bouban | |
| 5,892,447 A * | 4/1999 | Wilkinson | G08B 21/0286 340/407.1 |
| 6,175,308 B1 * | 1/2001 | Tallman | B60R 25/102 340/426.2 |
| 6,600,426 B1 | 7/2003 | Sacks | |
| 6,897,783 B2 | 5/2005 | Zeng | |
| 6,979,813 B2 | 12/2005 | Avril | |
| 2002/0057365 A1 * | 5/2002 | Brown | G08B 13/19619 348/552 |
| 2003/0011484 A1 * | 1/2003 | Zeng | H02H 5/12 340/686.6 |
| 2004/0137959 A1 * | 7/2004 | Salzhauer | G08B 1/08 455/567 |

(Continued)

FOREIGN PATENT DOCUMENTS

WO    WO2008008109    5/2008

*Primary Examiner* — Orlando Bousono
(74) *Attorney, Agent, or Firm* — Kyle A. Fletcher, Esq.

(57) ABSTRACT

The personal electrical injury protection device includes a first wireless transmitter, a first receiver, and a second receiver. The first wireless transmitter is adapted to be worn on an end user. The first wireless transmitter is in wired connection with at least one electrical sensor. The at least one electrical sensor is adapted to be attached to a limb of said end user, and is able to detect a change in voltage, and upon doing so shall signal the first receiver. The first receiver is in wireless communication with the first transmitter, and includes a speaker, and at least one light. The second receiver is adapted to turn off the main circuit breaker in order to stop electricity to be transmitted to all applicable circuits, and of which an end user has come into contact.

11 Claims, 4 Drawing Sheets

(56) References Cited

U.S. PATENT DOCUMENTS

| | | | |
|---|---|---|---|
| 2005/0018044 A1* | 1/2005 | Brown | G08B 13/19619 348/143 |
| 2005/0264427 A1* | 12/2005 | Zeng | H02H 5/12 340/635 |
| 2006/0084419 A1* | 4/2006 | Rocamora | G08C 17/02 455/419 |
| 2006/0087783 A1* | 4/2006 | Holley | H01H 9/168 361/81 |
| 2006/0109599 A1* | 5/2006 | Holley | H01H 9/168 361/64 |
| 2008/0024265 A1 | 1/2008 | Jones | |
| 2008/0085679 A1* | 4/2008 | Fettig | H04B 5/06 455/41.2 |
| 2009/0066504 A1* | 3/2009 | Breier | G08B 5/002 340/539.13 |
| 2012/0064492 A1* | 3/2012 | Pearce | A61N 1/0484 434/22 |
| 2012/0212339 A1* | 8/2012 | Goldblatt | G08B 25/016 340/539.11 |
| 2013/0021163 A1* | 1/2013 | Watford | H02H 3/046 340/638 |

* cited by examiner

PERSONAL ELECTRONIC INJURY PROTECTION DEVICE

CROSS REFERENCES TO RELATED APPLICATIONS

This continuation-in-part patent application claims priority to non-provisional patent application Ser. No. 14/501,309 that was filed on Sep. 30, 2014.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of wireless electrical injury protection devices, more specifically, a device that is able to operate a kill switch on an electrical panel in order to prevent or limit an electrical shock to a person coming into contact with an electrical wire elsewhere of said electrical panel.

SUMMARY OF INVENTION

An embodiment of the disclosure meeting the needs presented above by generally comprising the first wireless transmitter that is adapted to be worn on at least one limb of an end user. The first wireless transmitter is in connection with at least one internal data storage device and at least one electrical sensor. The at least one electrical sensor is adapted to be attached to a limb of said end user, and is able to detect change in voltage, and upon doing so, the first wireless transmitter shall signal the first receiver. A first receiver is in wireless communication with the second wireless transmitter, and includes a speaker, at least one SD storage port, at least one USB port, and at least one light. The first receiver is able to emit an audible and/or visual alarm upon receipt of a signal from the first transmitter in order to alarm others as to the electrical shock said end user has received. A second receiver is also in wireless communication with the second transmitter. The second receiver is adapted to be in mechanical connection with a main circuit breaker in order to stop electricity from being transmitted to all applicable circuits, and of which an end user had come into contact.

This together with additional objects, features, and advantages of the wireless electrical injury protection device will be readily apparent to those of ordinary skill in the art upon reading the following detailed description of the presently preferred, but nonetheless illustrative, embodiments when taken in conjunction with the accompanying drawings.

In this respect, before explaining the current embodiments of the wireless electrical injury protection device in detail, it is to be understood that the wireless electrical injury protection device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wireless electrical injury protection device.

It is therefore important that the claims be regarded as including such equivalent construction insofar as they do not depart from the spirit and scope of the wireless electrical injury protection device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
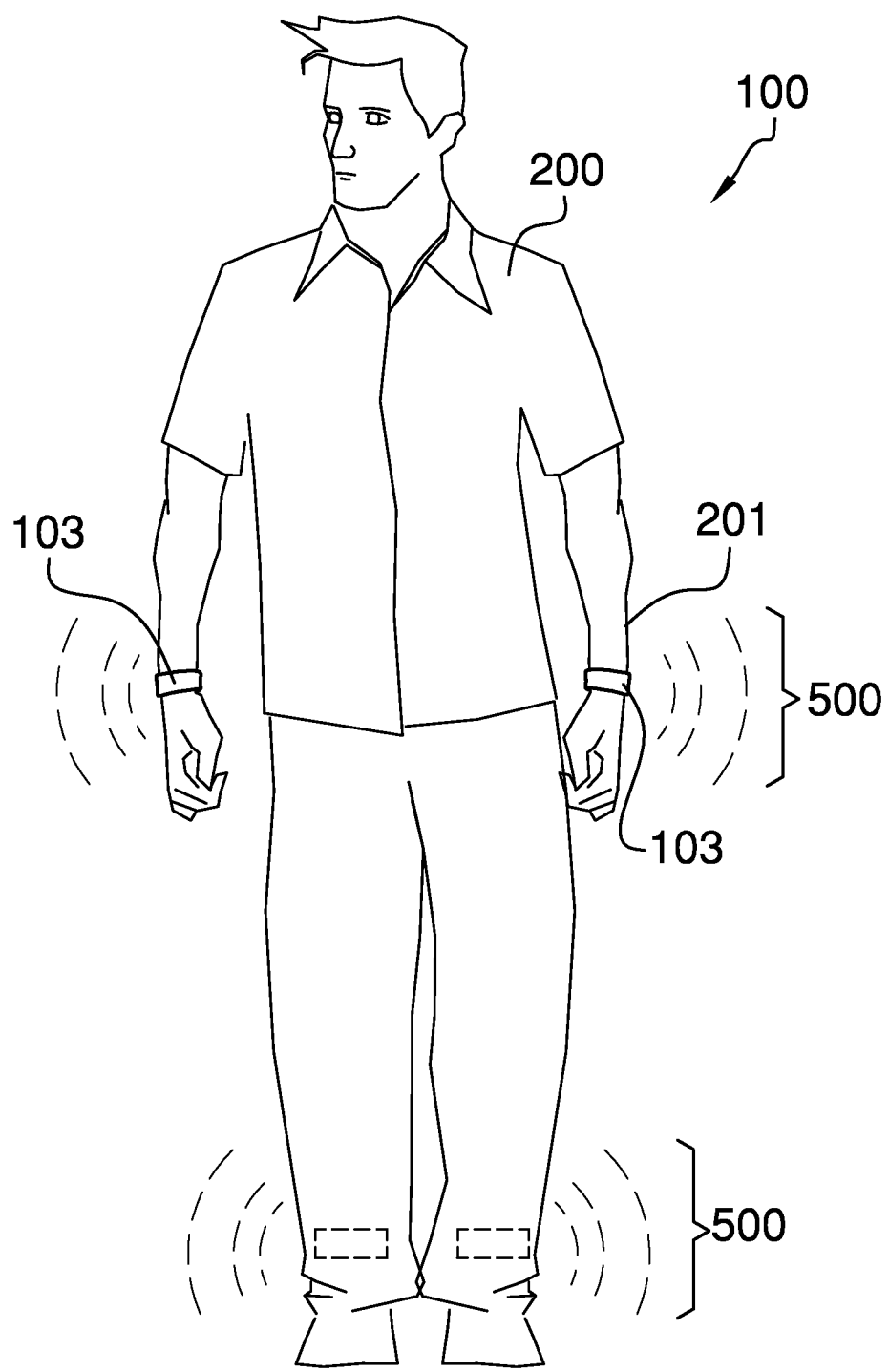
FIG. 1 is a view of an embodiment of the disclosure in use.
Figure 2:
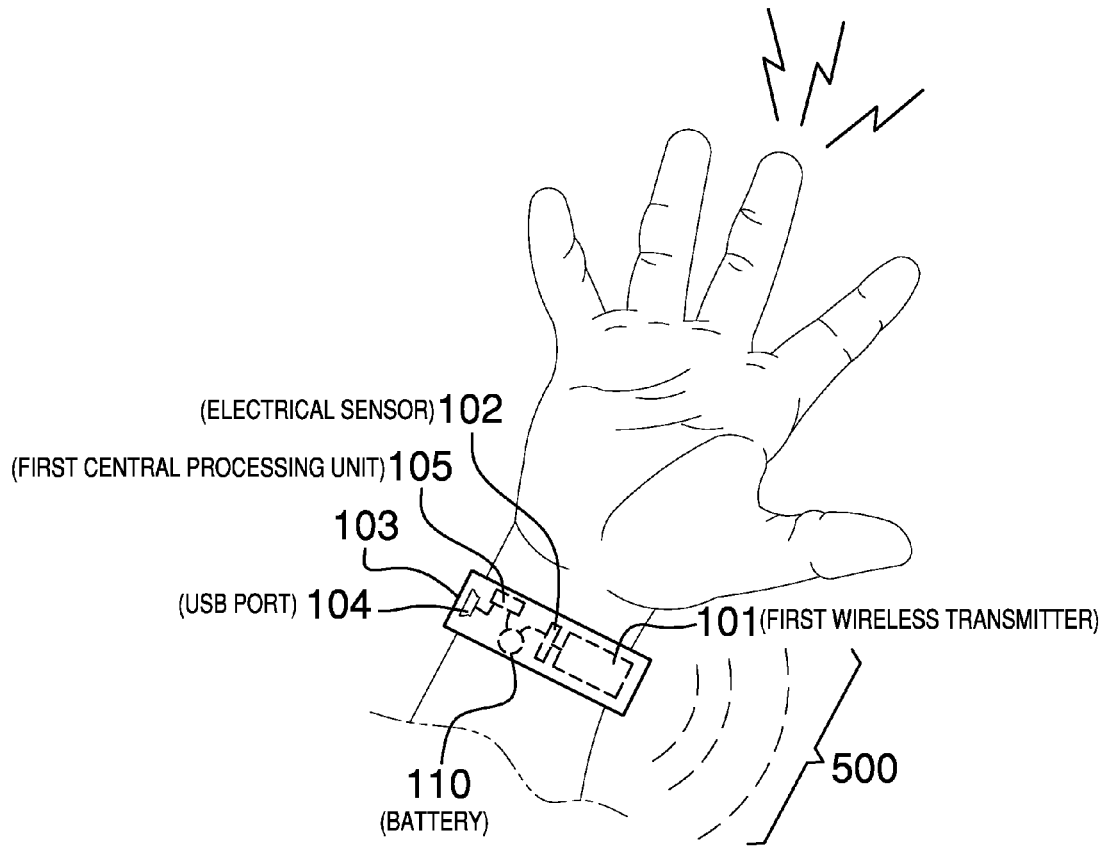
FIG. 2 is a view of an embodiment of the disclosure in use.
Figure 3:
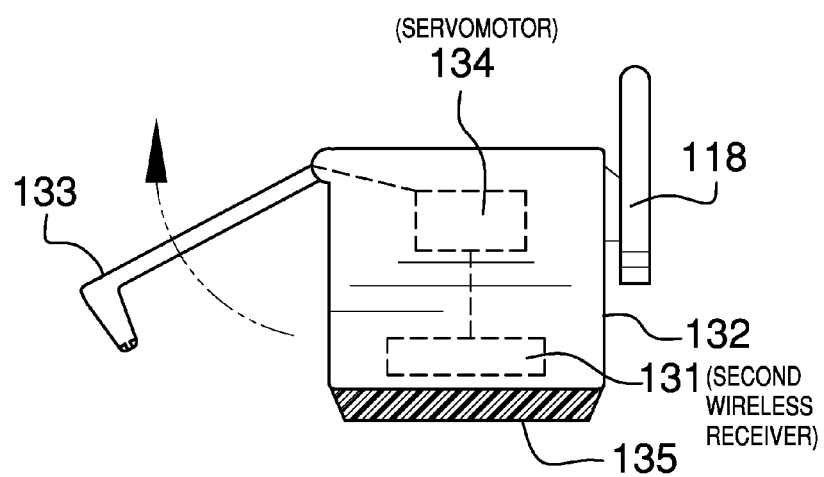
FIG. 3 is a detailed side view of an embodiment of the disclosure.
Figure 4:
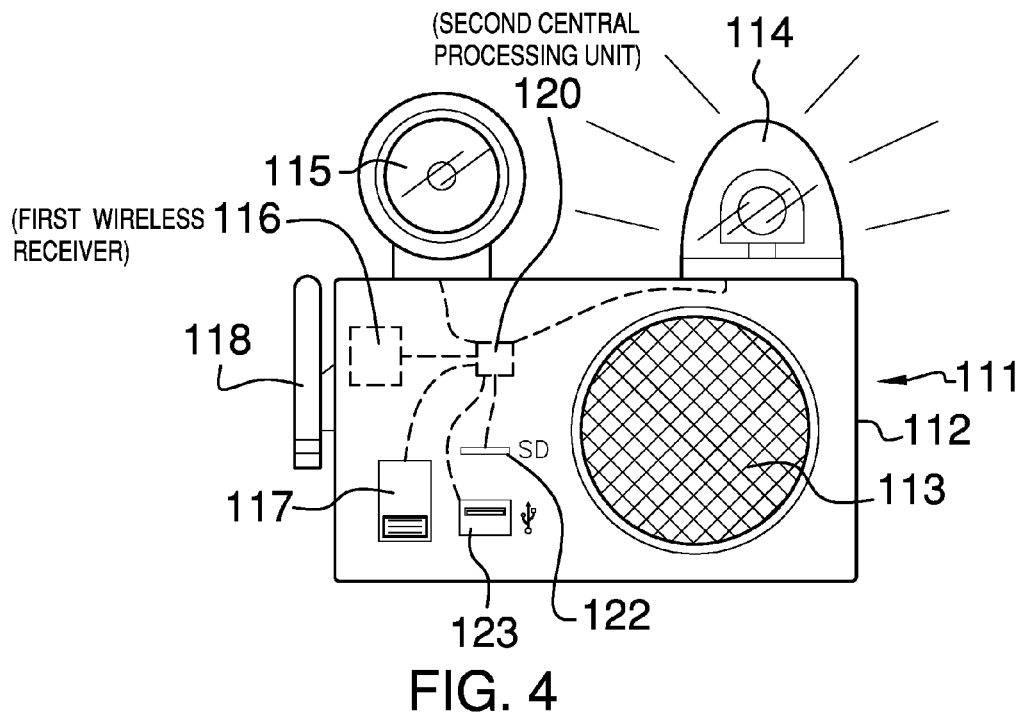
FIG. 4 is a front view of a component of an embodiment of the disclosure.
Figure 5:
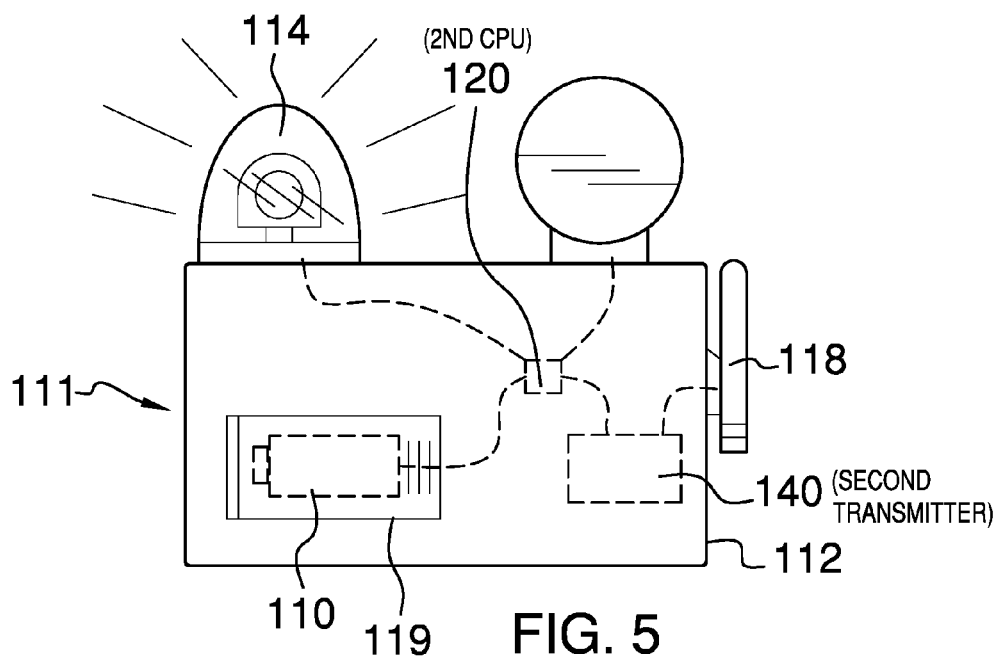
FIG. 5 is a rear view of a component of an embodiment of the disclosure.
Figure 6:
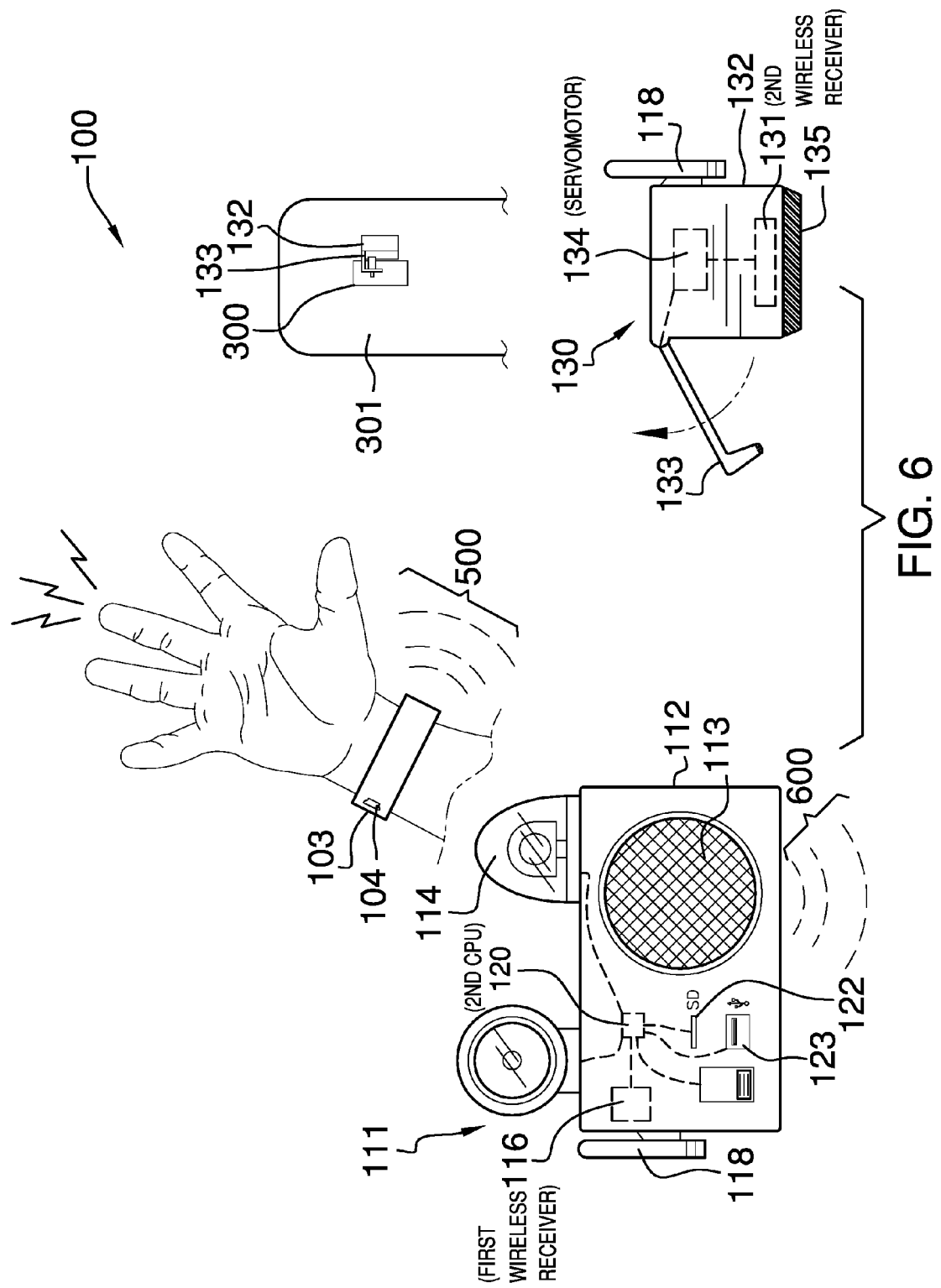
FIG. 6 is a view of all componentry associated with an embodiment of the disclosure.

Detailed reference will now be made to a first potential embodiment of the disclosure, which is illustrated in FIGS. 1 through 6. The wireless electrical injury protection device 100 (hereinafter invention) generally comprises a first wireless transmitter 101 that is adapted to be worn on an end user 200. The first wireless transmitter 101 is in connection with at least one electrical sensor 102, which is also in connection with at least one battery 110 that is fitted in a first battery compartment 106 therein. The at least one electrical sensor 102 is adapted to be attached to a limb 201 of said end user 200, and is able to detect a change in voltage, and upon doing so shall signal the first wireless transmitter 101 to generate a first wireless signal 500.

The at least one electrical sensor 102 includes a strap member 103 that is adapted to wrap around the limb 201 of the end user 200 in order to secure the at least one electrical sensor 102 thereto. The strap member 103 contains the at least one battery 110 that is located within the first battery compartment 106. The at least one battery 110 provides electrical needs for the first wireless transmitter 101, at least one electrical sensor 102, at least one USB Port 104, and a first central processing unit 105. The first central processing unit 105 is in direct connection with the at least one electrical sensor 102 and the first wireless transmitter 101. The at least one electrical sensor 102 is able to detect change in voltage, and upon doing so, the first central processing unit 105 will cause the wireless transmitter 101 to signal the first receiver 111 via the first wireless signal 500.

The invention 100 includes a first receiver 111. The first receiver is in wireless communication with the first transmitter 101. Moreover, the first receiver 111 is able to generate an audible and/or visual alarm upon detection of a first wireless signal 500 from the first transmitter 101. In other words, the function of the first receiver 111 is to emit an alarm to other persons in the general vicinity that the end user 200 has incurred an electrical shock. As a side note, the invention 100 is ideally suited for use with electricians, electrical engineers, and other personnel that work with electrical circuits and electrical componentry.

The first receiver 111 is further defined with a first receiver housing 112 that includes a speaker 113, a strobe light 114, a flashlight 115, a first wireless receiver 116, an on/off switch 117, at least one antenna 118, a second battery compartment 119, at least one SD Port 122, and at least one USB Port 123. The first wireless receiver 116 is located inside of the first receiver housing 112. The second battery compartment 119 houses the at least one battery 110 therein. The at least one battery 110 is used to provide the electrical needs of the first receiver 111. The first receiver 111 also includes a second central processing unit 120 that is inside of the first receiver housing 112. The second central processing unit 120 is wired in communication with the speaker 113, the strobe light 114, the flashlight 115, the first wireless receiver 116, an on/off switch 117, at least one antenna 118, at least one SD Port 122, at least one USB Port 123, and at least one battery 110.

The invention 100 includes a second receiver 130 that is also in wireless communication with a second transmitter 140. The second transmitter 140 is located in the first receiver 111. The second transmitter 140 is in wired communication with the second central processing unit 120, and communicates from the first receiver 111 over to the second receiver 130.

The second receiver 130 includes a second wireless receiver 131 that detects a second wireless signal 600 generated from the first transmitter 101. The second receiver 130 includes a second receiver housing 132 that houses the second wireless receiver 131. The second receiver 130 includes a breaker armature 133 this is rotatably engaged with the respect to the second receiver housing 132.

The breaker armature 133 is adapted to rotate a main breaker 300 of an electrical panel 301. The use of the second receiver 130 is to turn off all electrical power at the electrical panel 301 via the breaker armature 133. The second receiver housing 132 includes a magnetic member 135 that is adapted to secure the second receiver housing 132 against the electrical panel 301. The breaker armature 133 is used to turn the main breaker 300 in an emergency situation in order to cut off all electrical power that would otherwise cause injury or death to the end user 200.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A personal electrical injury protection device comprising:
 a first wireless transmitter that is adapted to detect a voltage surge on an end user;
 the first wireless transmitter is in wireless communication with a first receiver that emits an audible and/or visible alarm;
 a second receiver is in wireless communication with said first receiver;
 said second receiver is adapted to turn off a main breaker of an electrical panel;
 wherein the first wireless transmitter is adapted to be worn on said end user;
 wherein the first wireless transmitter is in connection with at least one electrical sensor, which is also in connection with at least one battery that is fitted in a first battery compartment therein;
 wherein the at least one electrical sensor is adapted to be attached to a limb of said end user, and is able to detect a change in voltage, and upon doing so shall signal the first wireless transmitter to generate a first wireless signal;
 wherein the at least one electrical sensor includes a strap member that is adapted to wrap around the limb of the end user in order to secure the at least one electrical sensor thereto;
 wherein the strap member contains the at least one battery that is located within the first battery compartment;
 wherein the at least one battery provides electrical needs for the first wireless transmitter, the at least one electrical sensor, at least one USB Port, and a first central processing unit;
 wherein the first central processing unit is in direct connection with the at least one electrical sensor and the first wireless transmitter;
 wherein the at least one electrical sensor is able to detect the change in voltage, and upon doing so, the first central processing unit will cause the first wireless transmitter to signal the first receiver via the first wireless signal;
 wherein the first receiver is in wireless communication with the first wireless transmitter;
 wherein the first receiver is able to generate the audible and/or visual alarm upon detection of the first wireless signal from the first wireless transmitter;
 wherein the first receiver is further defined with a first receiver housing that includes a speaker, a strobe light, a flashlight, a first wireless receiver, a receiver on/off switch, at least one receiver antenna, a second battery compartment, at least one receiver SD Port, and at least one receiver USB Port.

2. The personal electrical injury protection device according to claim 1 wherein the first wireless receiver is located inside of the first receiver housing.

3. The personal electrical injury protection device according to claim 2 wherein the second battery compartment houses at least one second battery therein; wherein the at least one second battery is used to provide the electrical needs of the first receiver.

4. The personal electrical injury protection device according to claim 3 wherein the first receiver is further defined with a second central processing unit that is inside of the first receiver housing.

5. The personal electrical injury protection device according to claim 4 wherein the second central processing unit is in wired communication with the speaker, the strobe light, the flashlight, the first wireless receiver, the receiver on/off switch, the at least one receiver antenna, the at least one receiver SD Port, the at least one receiver USB Port, and the at least one second battery.

6. The personal electrical injury protection device according to claim 5 wherein the second receiver is also in wireless communication with a second transmitter.

7. The personal electrical injury protection device according to claim 6 wherein the second transmitter is located in the first receiver housing; wherein the second transmitter is in wired communication with the second central processing unit, and communicates from the first receiver over to the second receiver.

8. The personal electrical injury protection device according to claim 7 wherein the second receiver includes a second wireless receiver that detects a second wireless signal generated from the first wireless transmitter; wherein the second receiver includes a second receiver housing that houses the second wireless receiver.

9. The personal electrical injury protection device according to claim 8 wherein the second receiver includes a breaker armature that is rotatably engaged with respect to the second receiver housing.

10. The personal electrical injury protection device according to claim 9 wherein the breaker armature is adapted to rotate said main breaker of said electrical panel such that the breaker armature is able to adaptively turn off all electrical power at the electrical panel in an emergency situation.

11. The personal electrical injury protection device according to claim 10 wherein the second receiver housing includes a magnetic member that is adapted to secure the second receiver housing against the electrical panel.

* * * * *